(12) United States Patent
O'Connell et al.

(10) Patent No.: US 10,911,455 B2
(45) Date of Patent: *Feb. 2, 2021

(54) USING THIRD PARTY INFORMATION TO IMPROVE PREDICTIVE STRENGTH FOR AUTHENTICATIONS

(71) Applicant: Visa International Service Association, San Francisco, CA (US)

(72) Inventors: Craig O'Connell, San Mateo, CA (US); Aditya Srivastava, Foster City, CA (US); Kevin Wong, Sausalito, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 229 days.

This patent is subject to a terminal disclaimer.

(21) Appl. No.: 16/050,228

(22) Filed: Jul. 31, 2018

(65) Prior Publication Data

US 2018/0337926 A1 Nov. 22, 2018

Related U.S. Application Data

(63) Continuation of application No. 14/934,063, filed on Nov. 5, 2015, now Pat. No. 10,069,831.

(60) Provisional application No. 62/075,465, filed on Nov. 5, 2014.

(51) Int. Cl.
*H04L 29/06* (2006.01)

(52) U.S. Cl.
CPC .............. *H04L 63/10* (2013.01); *H04L 63/08* (2013.01)

(58) Field of Classification Search
CPC ......... H04L 63/10; H04L 63/08; H04L 29/06; H04L 29/08; G06F 17/30; G06F 17/27
See application file for complete search history.

(56) References Cited

U.S. PATENT DOCUMENTS

| 8,379,936 B2 | 2/2013 | Sato |
| 8,688,543 B2 | 4/2014 | Dominguez |
| 8,726,033 B2 | 5/2014 | Dickinson et al. |
| 8,756,661 B2 | 6/2014 | Levenberg |
| 9,210,156 B1 | 12/2015 | Little |
| 2008/0040276 A1 | 2/2008 | Hammad et al. |

(Continued)

FOREIGN PATENT DOCUMENTS

WO    WO1999056194 A2    11/1999

*Primary Examiner* — Alexander Lagor
*Assistant Examiner* — Vu V Tran
(74) *Attorney, Agent, or Firm* — Kilpatrick Townsend & Stockton LLP

(57) ABSTRACT

Embodiments of the present invention are directed to methods and systems for utilizing the history of previous authentications and authorizations related to third party computers, as factors in determining whether a current request for accessing a resource should be authorized. A processor server computer, in determining whether to authorize access to the resource, may generate and send a query message to one or more of the third party computers to obtain authorization activity that the third party computers may have regarding a user and/or a device associated with the request. The processor server computer may use the authorization activity from the third party computers in determining whether the request is an authentic request and that the request should be authorized.

18 Claims, 7 Drawing Sheets

(56) References Cited

U.S. PATENT DOCUMENTS

| | | |
|---|---|---|
| 2008/0137593 A1* | 6/2008 | Laudermilch ......... H04W 12/08 |
| | | 370/328 |
| 2009/0249478 A1 | 10/2009 | Rosener et al. |
| 2011/0016534 A1 | 1/2011 | Jakobsson |
| 2012/0047207 A1* | 2/2012 | Callanan ............... G06F 16/951 |
| | | 709/204 |
| 2012/0066286 A1* | 3/2012 | Heredia ............. H04L 12/2814 |
| | | 709/201 |
| 2012/0221470 A1 | 8/2012 | Lyon |
| 2013/0103591 A1 | 4/2013 | Wheeler |
| 2013/0269020 A1 | 10/2013 | Griffin |
| 2014/0130127 A1 | 5/2014 | Toole |
| 2014/0201814 A1 | 7/2014 | Barkie |
| 2016/0164893 A1* | 6/2016 | Levi ..................... G06F 16/215 |
| | | 726/23 |

\* cited by examiner

```
<query>
    <requestor>_____</requestor>
    <identifiers>
        <firstname>_____</firstname>
        <lastname>_____</lastname>
        <username>_____</username>
        <phonenumber>_____</phonenumber>
        <emailaddress>_____</emailaddress>
        <deviceid>_____</deviceid>
        <accountid>_____</accountid>
        <location>_____</location>
        <reserved>_____</reserved>
    </identifiers>
    <activityrequested>
        <get_lastlogin>
            <date>_____</date>
            <time>_____</time>
        </get_lastlogin>
        <get_frauddetected>
            <value>_____</value>
        </get_frauddetected>
        <get_#authsuccesses>
            <value>_____</value>
        </get_#authsuccesses>
        <get_#authfailures>
            <value>_____</value>
        </get_#authfailures>
        <get_firstactivity>
            <date>_____</date>
            <time>_____</time>
        </get_firstactivity>
    </activityrequested>
</query>
```

— 302 (identifiers block)
— 304 (reserved)
— 306 (activityrequested block)

```
<query>
    <requestor>ProcessorComputer</requestor>
    <identifiers>
        <firstname>John</firstname>
        <lastname>Smith</lastname>
        <username>jsmith</username>
        <phonenumber>NULL</phonenumber>
        <emailaddress>jsmith@email.com</emailaddress>
        <deviceid>android-454bc334f</deviceid>
        <accountid>NULL</accountid>
        <location>NULL</location>
        <reserved>NULL</reserved>
    </identifiers>
    <activityrequested>
        <get_lastlogin>
            <date>NULL</date>
            <time>NULL</time>
        </get_lastlogin>
        <get_frauddetected>
            <value>NULL</value>
        </get_frauddetected>
        <get_#authsuccesses>
            <value>NULL</value>
        </get_#authsuccesses>
        <get_#authfailures>
            <value>NULL</value>
        </get_#authfailures>
        <get_firstactivity>
            <date>NULL</date>
            <time>NULL</time>
        </get_firstactivity>
    </activityrequested>
</query>
```

402 — identifiers block
404 — <reserved>NULL</reserved>
406 — activityrequested block

```
<queryresponse>
    <requestor>ProcessorComputer</requestor>
    <identifiers>
        <firstname>John</firstname>
        <lastname>Smith</lastname>
        <username>jsmith</username>
        <phonenumber>NULL</phonenumber>
        <emailaddress>jsmith@email.com</emailaddress>
        <deviceid>android-454bc334f</deviceid>
        <accountid>NULL</accountid>
        <location>NULL</location>
        <reserved>NULL</reserved>      ← 404
    </identifiers>
    <activityrequested>
        <get_lastlogin>
            <date>2015-11-03</date>
            <time>08:02:45 GMT</time>
        </get_lastlogin>
        <get_frauddetected>
            <value>0</value>
        </get_frauddetected>
        <get_#authsuccesses>
            <value>25</value>
        </get_#authsuccesses>
        <get_#authfailures>
            <value>1</value>
        </get_#authfailures>
        <get_firstactivity>
            <date>2012-05-21</date>
            <time>14:54:37 GMT</time>
        </get_firstactivity>
    </activityrequested>
</queryresponse>
```

402 (identifiers block), 506 (activityrequested block)

USING THIRD PARTY INFORMATION TO IMPROVE PREDICTIVE STRENGTH FOR AUTHENTICATIONS

CROSS-REFERENCE TO RELATED APPLICATIONS

This application is a continuation of U.S. application Ser. No. 14/934,063, filed Nov. 5, 2015 which claims the benefit of priority from U.S. Provisional Patent Application No. 62/075,465, filed Nov. 5, 2014, titled "USING THIRD PARTY INFORMATION TO IMPROVE PREDICTIVE STRENGTH FOR AUTHENTICATIONS," which is incorporated by reference in its entirety for all purposes.

BACKGROUND

Using computing devices (e.g., computers, mobile phone, smart watches, smart devices), a user engages in all types of interactions. These interactions may be for accessing resources, such as an application, a computer, a system/venue, and an account, as well as other interactions with remote server computers. In these interactions, the user and/or the computing device may be authenticated and/or authorized by the remote server computers.

As an increasing number of these interactions are performed using computing devices, rather than person-to-person, fraud and identity theft become areas of greater concern. Thus, there is a greater need to ensure that the authorized individual is the one requesting access and being granted access to a resource.

In current solutions, an entity (e.g., a server computer) that manages access rights and credentials for a resource may authenticate and authorize a user to access the resource by evaluating a credential issued to the user. However, this may be a single point of failure in situations where the user's credentials with the entity have been obtained through fraudulent means.

Thus, there is a need for new and enhanced methods of performing authorization processes that have greater efficiency and more reliability than current solutions at minimizing the risks of unauthorized access.

Embodiments of the invention address these and other problems, individually and collectively.

BRIEF SUMMARY

Embodiments of the present invention relate to systems and methods for utilizing the history of previous requests for accessing resources in determining whether a current request for accessing a resource should be authorized. In some embodiments, a processor server computer, as part of determining whether to authorize access to a resource, may generate and send a query message to one or more third party computers to obtain authorization activity that the third party computers may have regarding a user and/or a device associated with the request. The processor server computer may use the authorization activity from the third party computers in determining, with greater confidence, that the request is an authentic request and that the request should be authorized. To efficiently obtain the authorization activity, the processor server computer can use query templates with identifier tags to generate a query message that is sent in parallel to a plurality of third party servers. The query messages can request authorization activity for identifier tags that the authorizing server computer does not know, as the query template can include identifier tags not known for a corresponding profile.

One embodiment of the invention is directed to a method comprising, receiving, by a server computer from a first electronic device, a request for authorization to access a resource. The request may include request identification data to be used in determining whether to provide the access to the resource, the request identification data including one or more request identifiers. The method further comprises determining that at least one of the request identifiers in the request corresponds to a profile that includes one or more profile identifiers. The method further comprises retrieving a query template that includes a plurality of identifier tags. The query template may include an API for requesting information about the identifier tags, where each identifier tag corresponds to a different type of identifier. The method further comprises generating a query message using the query template by inserting at least one of the request identifiers and the profile identifiers into the query template in association with the corresponding identifier tags, and sending the query message to a plurality of third party servers that implement the API. The method further comprises receiving a plurality of query responses from the plurality of third party servers, the query responses including one or more authorization activity entry for each of one or more of the identifier tags. For each of a plurality of the authorization activity entries, the method further comprises retrieving an activity value from the authorization activity entry, assigning a weight to the activity value to obtain a weighted value, and applying the weighted value to an authorization model. The method further comprises determining an authorization response based on a result of the authorization model, and sending the authorization response to the first electronic device, instructing the first electronic device as to whether to grant access to the resource.

Another embodiment of invention is directed to a server computer comprising: a processor and a computer readable medium coupled to the processor, the computer readable medium comprising code, executable by the processor to implement a method comprising receiving, by a server computer from a first electronic device, a request for authorization to access a resource. The request may include request identification data to be used in determining whether to provide the access to the resource, the request identification data including one or more request identifiers. The method further comprises determining that at least one of the request identifiers in the request corresponds to a profile that includes one or more profile identifiers. The method further comprises retrieving a query template that includes a plurality of identifier tags. The query template may include an API for requesting information about the identifier tags, where each identifier tag corresponds to a different type of identifier. The method further comprises generating a query message using the query template by inserting at least one of the request identifiers and the profile identifiers into the query template in association with the corresponding identifier tags, and sending the query message to a plurality of third party servers that implement the API. The method further comprises receiving a plurality of query responses from the plurality of third party servers, the query responses including one or more authorization activity entry for each of one or more of the identifier tags. For each of a plurality of the authorization activity entries, the method further comprises retrieving an activity value from the authorization activity entry, assigning a weight to the activity value to obtain a weighted value, and applying the weighted value to an authorization model. The method further comprises determining an authorization response based on a result of the authorization model, and sending the authorization response to the first electronic device, instructing the first electronic device as to whether to grant access to the resource.

These and other embodiments of the invention are described in further detail below with reference to the Drawings and the Detailed Description.

BRIEF DESCRIPTION OF THE DRAWINGS

FIG. 3 shows an exemplary query template according to an embodiment of the invention.

FIG. 4 shows an exemplary query message according to an embodiment of the invention.

FIG. 5 shows an exemplary query response message according to an embodiment of the invention.

TERMS

Figure 1:
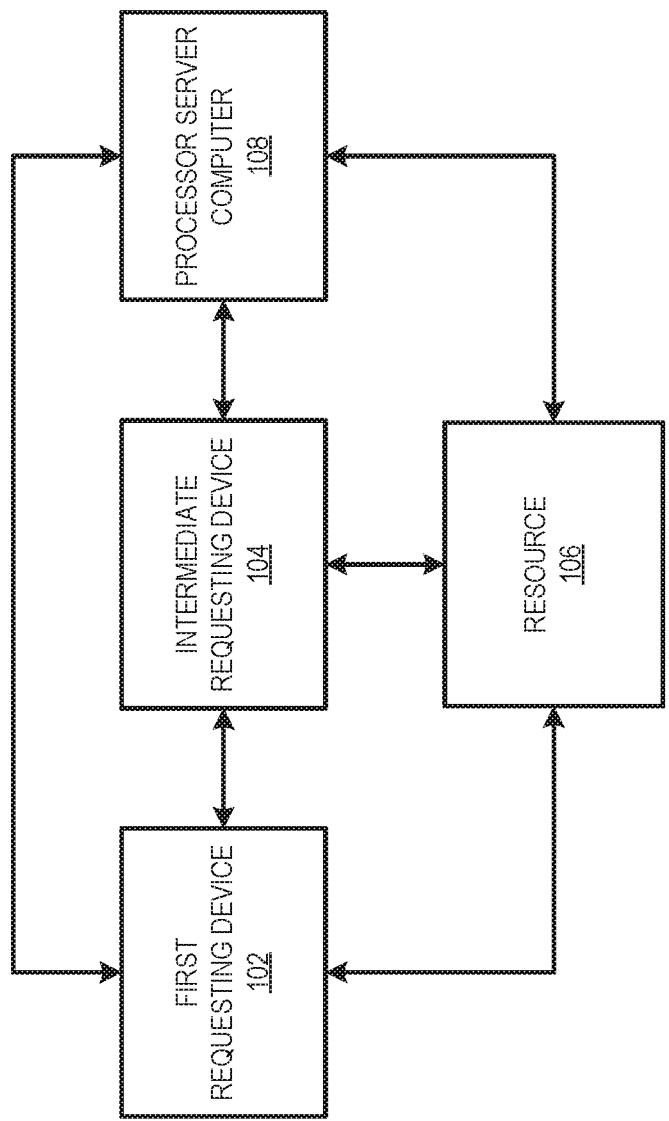
FIG. 1 shows a block diagram of an exemplary authorization system according to an embodiment of the invention.

Prior to discussing embodiments of the invention, descriptions of some terms may be helpful in providing a better understanding of the invention.

The term "authorization" may refer to a process for granting permission to an entity. In some embodiments, authorization may include granting access rights to an entity to allow the entity to interact with a resource (e.g., a computer, an account). In some embodiments, the authorization may include access policies and restrictions for interactions by the entity with the resource.

The term "resource" may refer to an asset. In some embodiments, the resource may be a computer, an account, a building, or a system/venue. In some embodiments, the resource may be a physical or virtual component within a computer system.

The term "device" may refer to a computing device. In some embodiments, the electronic device can be used to communicate with another device, computer, or system. It can include an electronic device that is used to conduct a transaction. The device may be an apparatus that includes one or more electronic components, which can be used to communicate with another device or system. The electronic device may be capable of conducting communications over a network. An electronic device may be in any suitable form. For example, suitable electronic devices can be hand-held and compact so that it can fit into a user's wallet and/or pocket (e.g., pocket-sized). The electronic device can include a processor, and memory, input devices, and output devices, operatively coupled to the processor. Specific examples of electronic devices include cellular or mobile phones (e.g., smartphones), tablet computers, desktop computers, personal digital assistants (PDAs), pagers, portable computers, smart cards, and the like. Additional user computing devices may include wearable devices, such as smart watches, glasses, fitness bands, ankle bracelets, rings, earrings, etc. In some embodiments, the electronic device may be referred to as a requesting device.

The term "identifier" may refer to any information that may be used as a reference for an entity, object or individual. For example, an account identifier may be used to uniquely identify an account. In some embodiments, the identifier may be an alphabetic, numeric or alphanumeric string of characters. In other embodiments, the identifier may be a graphic, a token, a bar code, a QR code, or any other information that may be used to uniquely identify an entity.

The term "identifier tag" may refer to a reference to a type of identifier. In some embodiments, identifier tags may be used to indicate a position where an identifier of the type indicated by the corresponding identifier tag should be placed. For example, a query template may include a plurality of identifier tags, including "first name", "last name", "user name", "email address", and "device identifier".

The term "authorization activity" may refer to types of actions associated with authorizations. In some embodiments, the authorization activity may relate to previous authentication processes and/or authorization processes, and may include dates and times of previous authentications and authorizations, number of successful authentications and authorizations, number of unsuccessful authentications and authorizations, amount of time since last authorization, date and time of initial authorization, etc. Each authorization activity may have an associated activity value, which may be an alphabetic, numeric, or alphanumeric string of characters.

The term "authorization model" may refer to model based on authorization data. In some embodiments, the authorization model may be a combination of a plurality of authorization activities, and their corresponding activity values and/or weight activity values. The authorization model may be generated using data obtained by the processor server computer from a profile of an entity and from prior authentication processes and authorization processes performed by one or more third party computers.

The term "transaction" may refer to an exchange or interaction between two entities. In some embodiments, the transaction may be a non-financial transaction, such as exchanging of data or information between two entities, such as the transfer of data or information across a communications channel. Examples of non-financial transactions may include transactions for verifying an identity of a server computer and/or rights and restrictions associated with the server computer. In some embodiments, a transaction may refer to a transfer of value between two users (e.g., individuals or entities). A transaction may involve the exchange of monetary funds or the exchange of goods or services for monetary funds between two individuals or entities. In other embodiments, the transaction may be a purchase transaction involving an individual or entity purchasing goods or services from a merchant or other entity in exchange for monetary funds.

The term "message" may include any data or information that may be transported from one entity to another entity (e.g., one device to another device). Messages may be communicated internally between devices/components within a computer or computing system or externally between devices over a communications network.

The term "profile" may refer to information regarding an entity. In some embodiments, the profile may be a representation of information regarding the entity, including rights and restrictions, identification data, and authorization data. For example, a profile for an entity may include data indicating the name, address, contact information, and accounts associated with the entity. In some embodiments, the profile may also be used to store financial information for the entity. In some embodiments, the profile may be stored in a database and be linked to an identifier associated with the entity the profile is related to. In some embodiments, the entity may have one or more profiles.

The term "database" may include any hardware, software, firmware, or combination of the preceding for storing and facilitating the retrieval of information. In addition, the database may use any of a variety of data structures, arrangements, and compilations to store and facilitate the retrieval of information.

The term "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

DETAILED DESCRIPTION

Embodiments of the invention are directed to systems and methods for utilizing the history of previous requests for accessing resources in determining whether a current request for accessing a resource should be authorized. As part of determining whether to provide authorization to access a resource, data may be retrieved by third party computers. The data may be retrieved using query messages generated from query templates. The query messages may include one or more identifiers received in the request and/or stored in a profile. A query response from the third party computer may include authorization activities associated with each of the one or more identifiers. Values associated with the authorization activities can be used in an authorization model to determine whether the request for accessing the resource should be authorized.

I. Authorization

Authorizations may relate to a process for granting or specifying rights for accessing a resource (e.g., a computer, a location, an account). FIG. 1 shows a block diagram of an exemplary authorization system 100 according to an embodiment of the invention. The system 100 in FIG. 1 includes a first requesting device 102, an intermediate requesting device 104, a resource 106, and a processor server computer 108. Each of these systems and computers may be in operative communication with each other via any suitable communication medium (including the Internet), using any suitable communications protocol.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. For example, some embodiments may only include the first requesting device 102, the resource 106, and the processor server computer 108, and may omit the intermediate requesting device 104.

The first requesting device 102 may be in any suitable form. The first requesting device 102 may include a processor and a computer readable medium coupled to the processor, the computer readable medium comprising code, executable by the processor for performing the functionality described herein. The first requesting device 102 may be communicatively coupled to the intermediate requesting computer 104 via a communications medium in order to access a resource 106, and/or may be communicatively coupled to the resource 106. Example of first requesting devices 102 may include any device capable of accessing the Internet, such as a personal computer, cellular or wireless phones (e.g., smartphones), personal digital assistants (PDAs), tablet phones, tablet computers, laptop computers, desktop computers, portable computers, smart cards, smartwatches, handheld specialized readers, and the like.

The intermediate requesting device 104 may be in any suitable form. The intermediate requesting device 104 may include a processor and a computer readable medium coupled to the processor, the computer readable medium comprising code, executable by the processor for performing the functionality described herein. In some embodiments, the intermediate requesting device 104 may be a computer that manages access to a resource 106. In such embodiments, when the first requesting device 102 requests authorization to access the resource 106, the intermediate requesting device 104 may generate a request message and send the request message to the processor server computer 108 to determine whether the request for authorization to access the resource 106 should be granted or denied.

The resource 106 may be a computer, an account, a building, or a system/venue. In some embodiments, the resource may be a physical or virtual component within a computer system. The resource 106 may include a processor and a computer readable medium coupled to the processor, the computer readable medium comprising code, executable by the processor for performing the functionality described herein.

The processor server computer 108 may be in any suitable form. The processor server computer 108 may include a processor and a computer readable medium coupled to the processor, the computer readable medium comprising code, executable by the processor for performing the functionality described herein. In some embodiments, the processor server computer 108 may be coupled to a database and may include any hardware, software, other logic, or combination of the preceding for servicing the requests from one or more client computers. The processor server computer 108 may comprise one or more computational apparatuses and may use any of a variety of computing structures, arrangements, and compilations for servicing the requests from one or more client computers. In some embodiments, the processor server computer 108 may operate multiple server computers. In some embodiments, the processor server computer 108 may be referred to as an authorizing processor computer.

As depicted in FIG. 1, the first requesting device 102 may request authorization to access the resource 106. In some embodiments, when the first requesting device 102 may provide an indication that the first requesting device 102 is seeking to access the resource 106. For example, where the resource 106 is a server computer, the first requesting device 102 may provide a user name and password to the resource 106. Where the resource 106 is a building, the first requesting device 102 may send data to an access device or computer through a contact or contactless data communication connection. In some embodiments, the communications connection may be via a radio-frequency identification (RFID) signal, a short-range network connection (e.g., Bluetooth®), or any other communications connection as would be understood by one of ordinary skill in the art.

In some embodiments, an authorization request message may be generated. In some embodiments, the first requesting device 102 may request authorization to access the resource 106 through a communications connection between the first requesting device 102 and the processor server computer 108. In other embodiments, the first requesting device 102 may request authorization to access the resource 106 directly through a communications connection between the first requesting device 102 and the resource 106. In such embodiments, the processor server computer 108 and the resource 106 may be a single device (e.g., computer). In such embodiments, an intermediate requesting device 104 may not be present.

In some embodiments, the first requesting device 102 may request authorization to access the resource 106 through an intermediate requesting device 104. In such embodiments, the resource 106 may be managed, maintained, or operated by the intermediate requesting device 104. In some embodiments, the intermediate requesting computer 104 may be an access device for accessing a resource 106 in the form of a computer. In other embodiments, the intermediate requesting device 104 may be an access device for accessing a resource 106 in the form of a building, venue, or system (e.g., transit system). In such embodiments, the intermediate requesting computer 104 may be used to protect the resource 106 from unauthorized accesses or limit the interactions by other devices with the resource 106.

In some embodiments, the authorization request message may be generated by the resource 106 or the intermediate requesting device 104 in response to the indication that the first requesting device 102 is seeking to access the resource 106. The authorization request message may include identifying information for the first requesting device (e.g., account information, device data, user data) and information for the resource 106 that authorization for access is being requested. The authorization request message may be sent to the processor server computer 108 using an appropriate communications channel. The processor server computer 108 may determine whether to authorize the request from the first requesting device 102 to access the resource 106 using the identifying information for the first requesting device. In some embodiments, the processor server computer 108 may have a pre-existing relationship with the first requesting device 102. For example, the processor server computer 108 may have generated and/or distributed authenticated credentials (e.g., device identifier, user identifier, password) to the first requesting device 102.

In some embodiments, the processor server computer 108 may have stored data indicating that the first requesting device 102 is a trusted device or was previously authenticated, or may perform a challenge process with the first requesting device 102 to verify the authenticity of a user associated with the first requesting device 102. The stored data may be associated with a profile for a user or a device. The processor server computer 108 may use the stored data and/or the results in a decisioning process. The processor server computer 108 may then generate an authorization response message, which is transmitted back to the intermediate requesting device 104 and/or the resource 106.

II. Retrieving Data from Third Party Computers

In some embodiments, in order to determine whether a request for accessing a resource should be authorized, additional information beyond the data stored by the processor server computer 108 may be requested and/or retrieved. In such embodiments, the processor server computer 108 may request and receive data from one or more of a plurality of third party computers.

Figure 2:
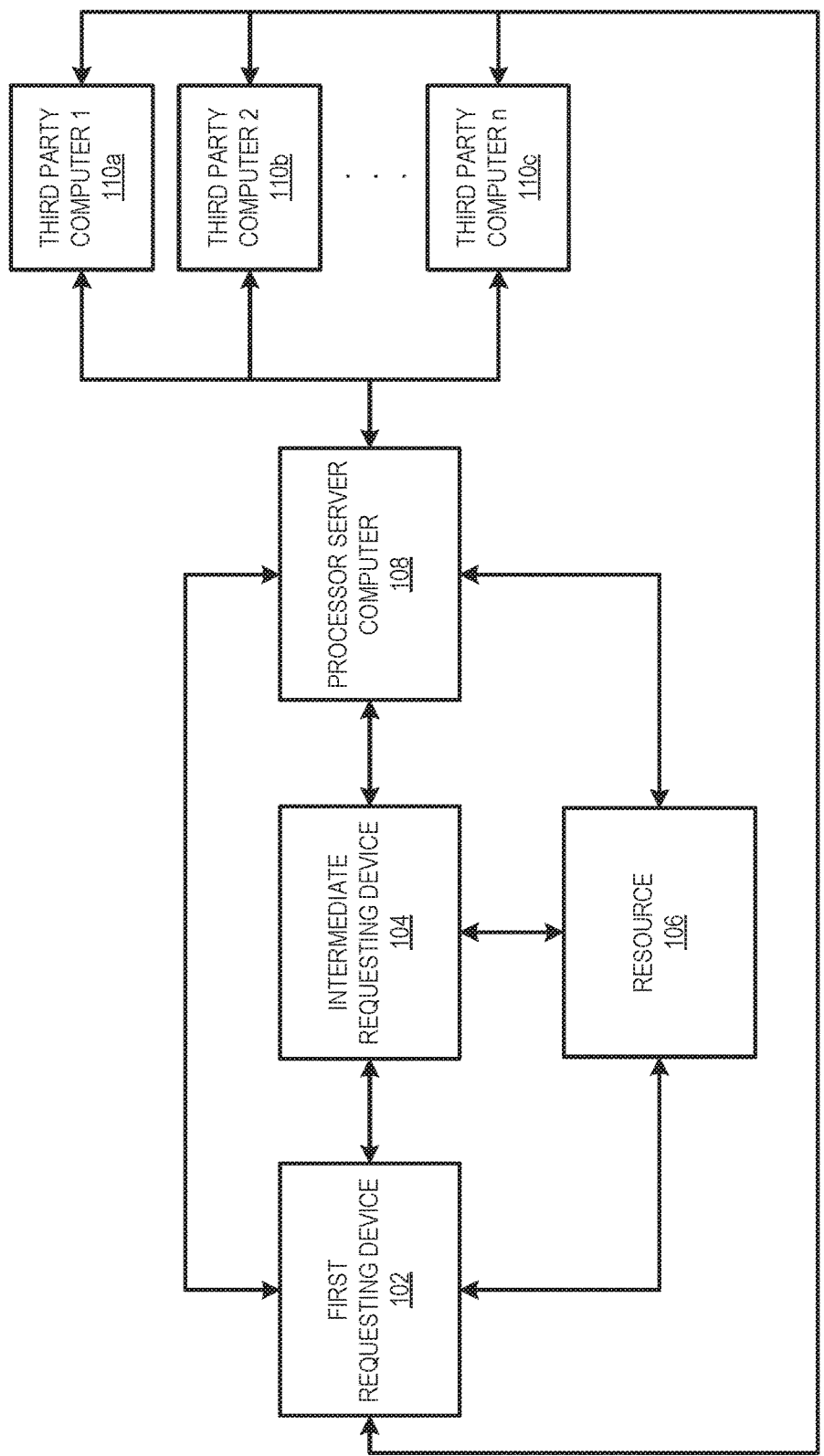
FIG. 2 shows a block diagram of an exemplary authorization system utilizing third party computers according to an embodiment of the invention.

FIG. 2 shows a block diagram of an exemplary authorization system 200 utilizing third party computers according to an embodiment of the invention. The system 200 includes a first requesting device 102, an intermediate requesting device 104, a resource 106, a processor server computer 108, and third party computer 110a-110c. Each of these systems and computers may be in operative communication with each other via any suitable communication medium (including the Internet), using any suitable communications protocol.

For simplicity of illustration, a certain number of components are shown in FIG. 2. It is understood, however, that embodiments of the invention may include more than one of each component. In addition, some embodiments of the invention may include fewer than or greater than all of the components shown in FIG. 2.

The third party computers 110a-c may each be associated with a different entity, service provider, or system. The third party computers 110a-c may be server computers capable of communicating over a network. Each of the third party computers 110a-c may include a processor and a computer readable medium coupled to the processor, the computer readable medium comprising code, executable by the processor for performing the functionality described herein. Each of the third party computers 110a-c may perform authentication or authorization processes, and may have stored data related to prior authentications of the first requesting device 102 or a user associated with the first requesting device 102. The third party computers 110a-c may be in operative communication with the processor server computer 108 in order to transmit authentication and authorization data for authentication and authorization processes performed by the third party computers 110a-c.

In some embodiments, when the processor server computer 108 receives an authorization request message from the intermediate requesting device 104 indicating that the first requesting device 102 is requesting access to the resource 106, the processor server computer 108 may send query messages to the third party computers 110a-c. The processor server computer 108 may transmit the query messages using an application programming interface (API). The API may allow the processor server computer 108 or an application operating on the processor server computer 108 to interface with and transmit data to applications operating on the third party computer 110a-c. The API may include a library that include requirements that govern how one application can talk to another application, or how one computing device can talk to another computer device. The API may include data indicating the formatting and communications protocol used by each of the third party computers 110a-c or applications operating on the third party computer 110a-c.

For example, as shown in FIG. 2, the processor server computer 108 may send a first query message to third party computer 1 110a, a second query message to third party computer 2 110b, and so on. Each message may be formatted differently based on the set of requirements associated with the particular third party computer 110a-c and/or the particular application operating on the third party computer 110a-c. In some embodiments, the content of the query messages transmitted by the processor server computer 108 may be the same for all third party computers 110a-c, and the query messages may be sent in parallel to the third party computers 110a-c.

The third party computers 110a-c may transmit response messages back to the processor server computer 108 with data related to previous authentication and authorization processes with the first requesting device 102. The data related to previous authentication and authorization processes may have been generated through a prior interaction between the first requesting device 102 and the third party computers 110a-c (e.g., a prior access request, a prior transaction).

For example, third party computer 1 110a may be a server computer for a social media website and the user may have requested access to the social media website by providing a user name and password using the first requesting device 102. Third party computer 1 110a may have stored authorization activity based on this interaction, including a result of the authorization process and tied to the identifiers associated with the user and the first requesting device 102.

In another example, third party computer 1 110a may have interacted with a different device associated with the user, other than the first requesting device 102. The authorization activity associated with the interaction with the different device may also be stored by third party computer 1 110a, and tied to identifiers associated with the user. In this situation, the authorization activity may be tied to the different device, and may not be tied to the first request device 102. However, the authorization activity may be identified using other identifiers, such as name, user name, or email address.

The response messages may similarly be transmitted from the third party computers 110a-c to the processor server computer 108 using an API.

III. Identifiers and Queries

In some embodiments, in order to retrieve data from the third party computers 110a-c, the processor server computer 108 may use identifiers associated with a user or a device associated with a request to access a resource. A query template may be populated with the identifiers to generate a query message that is sent to the third party computers 110a-c.

A. Identifiers

The query message sent from the processor server computer 108 to the third party computers 110a-c may include one or more identifiers. The identifiers can include data associated with the authorization request message, the first requesting device 102, and/or a user of the first requesting device 102.

Examples of types of identifiers may include a device type, a device identifier, an account number, a user identifier, an email address, a physical address, a phone number, an internet protocol (IP) address, browser data, application data, operating system data, GPS location data, and biometric data.

In some embodiments, the identifiers may be retrieved from the authorization request message (e.g., request identifiers) or from a profile associated with the first requesting device 102 or the user of the first requesting device 102 (e.g., profile identifiers). For example, the authorization request message may include a plurality of request identifiers, such as a first name, a last name, and a device identifier. The processer server computer 108 may be able to correlate the request identifiers with a profile stored in a database coupled to the processer server computer 108. In some embodiments, one or more of the identifiers may be known to the processor server computer 108 and previously stored in the profile.

In some embodiments, the processor server computer 108 may identify new identifiers in the received authorization request message. For example, a received authorization request message may include a user identifier (e.g., name, login id) previously identified by the processor server computer 108 and stored in the profile. In other embodiments, the received authorization request message may also include identifiers that may not be known or previously identified by the processor server computer 108.

For example, the authorization request message may include a device identifier not previously identified by the processor server computer 108 and not stored in the profile. The request for authorization to access the resource may include a user name and email address previously identified by the processor server computer 108 and included in the profile for the user, but the requesting device may be a new device with a device identifier unknown to the processor server computer 108.

In some embodiments, in addition to requesting data for known identifiers, when the processor server computer 108 identifies new identifiers that may be associated with the profile, the processor server computer 108 may seek data from the third party computers 110a-c regarding the new identifiers. In such embodiments, the processor server computer 108 may generate a query message including one or more of the identifiers.

B. Query Templates

In some embodiments, the processor server computer 108 may use a query template to generate a query message to be sent to the third party computers 110a-c. The query template may including a plurality of fields (e.g., identifier tags), where each field is associated with a different identifier. The query template may be predetermined and retrieved by the processor server computer 108.

FIG. 3 shows an exemplary query template 300 according to an embodiment of the invention. FIG. 3 is one example of a query template 300, where the query template 300 includes a plurality of identifier tags. In other embodiments, the query template 300 may be in other forms. The processor server computer 108 may retrieve the query template from a database or storage disk. In some embodiments, the processor server computer 108 may store a single query template 300 that is used for generating all query messages. In other embodiments, the processor server computer 108 may store multiple query templates 300 that may be for different types of requests. For example, one query template may be for authorizing access to a computer resource, while another query template may be for authorizing a payment transaction.

As shown in FIG. 3, the query template 300 may include a plurality of identifier tags 302. Each of the plurality of identifier tags 302 may be associated with a different identifier. For example, the query template 300 may include identifier tags 302 for first name, last name, user name, phone number, email address, device identifier, account identifier, and location. The query template 300 may include additional identifier tags for additional identifiers, and may have one or more reserved tag 304 for new identifier tags. The query template 300 may include all identifier tags specified in the API. The identifier tags 302 may be types of data that are associated with a user or a device. The identifier tags 302 may correlate to the types of identifiers stored in a profile by the processor server computer 108 for a user or a device.

Each of the identifier tags 302 may have a field or space for entry of data. The fields for the identifier tags 302 may be populated with identifiers received in the request and/or stored in a profile.

The query template 300 may also include tags 306 for authorization activity. As described in further detail below, authorization activity may include data related to prior authentication processes and authorization processes. In such embodiments, the query template 300 may include authorization activity tags 306 for the types of authorization activity requested by the requestor, and the format of the data to be received. For example, the authorization activities may include, but is not limited to, the date and time of the last login, the number of transactions with suspected or confirmed fraud, the number of successful authorizations, the number of unsuccessful authorizations, and the first activity associated with an identifier. In the embodiment shown in FIG. 3, the authorization activities are requested for each identifier. In other embodiments, the authorization activities requested may be different for each type of identifier. For example, the requestor may request data related to the last login and number of authorization failures associated with a user name, but may only want a date and time of the first activity associated with a device identifier.

In some embodiments, the query template 300 may also include an API. The API may include programming instructions and requirements for formatting messages sent between the processor server computer 108 and the third party computers 110a-c to enable the receiving third party computer 110a-c to understand the query message sent by the processor server computer 108.

C. Query Messages

Once the query template 300 has been retrieved from the database, the processor server computer 108 may generate a query message. The query message may be generated using the query template by inserting at least one of the request identifiers and the profile identifiers into the query template.

As noted above, in some embodiments, the content of the query messages transmitted by the processor server computer 108 may be the same for all third party computers 110a-c, such that all of the query messages associated with a single authorization request message may include the same identifiers for the same corresponding identifier tag. For example, the processor server computer 108 may populate the identifiers received in the request and/or stored in the profile into the appropriate field for the corresponding type of identifier tags 302.

FIG. 4 shows an exemplary query message 400 according to an embodiment of the invention. The query message 400 may include a plurality of request identifiers and profile identifiers inserted into the fields for the corresponding identifier tags 402. The query message 400 may also include a reserved field or space 404, and a plurality of authorization activity tags 406. In some embodiments, identifier tags 402 and authorization activity tags 406 that do not have data may have "NULL" inserted into the corresponding fields. This may be an indication to the third party computers 110a-c that the processor server computer 108 does not have data for such identifier tags 402 and authorization activity tags 406. In some embodiments, the query message may be implemented as an XML or JSON request. The query message may include a plurality of identifiers by providing a plurality of identifier tags and the corresponding identifier. For example, the query message 400 may include, "<emailaddress>jsmith@email.com</emailaddress>," which may indicate that the processor server computer 108 has the value "jsmith@email.com" as the identifier for the "emailaddress" identifier tag. In this example, the processor server computer 108 may have retrieved the email address (e.g., jsmith@email.com) from the profile. The processor server computer 108 may have parsed an identifier from the authorization request and used this identifier to locate a profile stored in a database.

In some embodiments, the processor server computer 108 may parse through the profile to determine whether the profile stores an identifier corresponding to a type of identifier tag. The processor server computer 108 may retrieve additional identifiers from the profile, such as the email address, identify the email address identifier tag in the query message 400, and insert "jsmith@email.com" into the corresponding identifier field for the email address identifier tag. As described above with respect to FIG. 3, the query message 400 may also include identifier tags 302 and corresponding identifiers for first name, last name, user name, phone number, email address, device identifier, account identifier, location, and reserved space 304 for additional identifier tags.

In addition, the query message 400 may also include authorization activity tags 306. In some embodiments, as shown in FIG. 4, the values of the authorization activities may be "NULL" when sent to the third party computers 110a-c. In other embodiments, the value of the authorization activities may be left blank.

IV. Authorization Activity of Identifiers

The third party computers 110a-c may store one or more identifiers associated with a user or a device. The identifiers may be correlated to authorization activities (e.g., authentication processes, authorization processes) from interactions between the user with the third party computers 110a-c and/or between the device with the third party computers 110a-c. The third party computers 110a-c may store activity values associated with each of the authorization activities, and can return the activity values to the processor server computer 108.

A. Overview of Authorization Activities and Corresponding Values

The third party computers 110a-c may have data associated with previous authentication processes and/or authorization processes associated with a given identifier. These authentication processes and authorization processes may collectively be referred to as authorization activities. For example, third party computer 1 110a may be a website and may have authorization activity data related to an authentication of a user identifier (e.g., login id) for the website. In another example, third party computer 1 110b may be an account issuer and may have authorization activity data related to a transaction (e.g., financial transaction, access transaction) performed by a user.

The authorization activities between the user or device and the third party computers 110a-c may be stored in a database at the corresponding third party computers 110a-c. In some embodiments, the third party computers 110a-c may access the database using a primary key. In some embodiments, where the query message does not include the primary key, the third party computers 110a-c may use a foreign key to access the database.

For example, the database may use a user name as a primary key. In some embodiments, this may be represented as a table with the initial column being user names organized alphabetically, with subsequent columns for additional identifiers (e.g., name, city, email address, device identifier). In such embodiments, all entries in a single row are correlated to the primary key (e.g., user name). When the third party computers 110a-c receive a query message with a user name "j smith," the third party computers 110a-c may locate the correct entry in the database.

In some embodiments, the processer server computer 108 may not have a user name for associated with the request, resulting in the query message not including an entry for the primary key. In such embodiments, the third party computers 110a-c may use an index associated with a foreign key, locate the user name correlated to the foreign key, and then access the database.

For example, the query message may include identifier tags 402 for a device identifier (e.g., android-454bc334f), an email address (e.g., jsmith@email.com), a first name (e.g., John), and a last name (e.g., Smith). The third party computers 110a-c may use the device identifier as the foreign key, and access an index file that correlates device identifiers with user names. The third party computers 110a-c may determine the correct user name associated with device identifier "android-454bc334f," and use the determined user name to access the database in the manner described previously.

In another embodiment, the third party computers 110a-c may recognize the identifier tags are foreign, but may be able to generate a primary key using the data from the query message. For example, as shown in FIG. 4, the query message may include identifier tags 402 for first name (e.g., John) and last name (e.g., Smith). In such an example, the primary key for a third party computer 110a-c may be a full name of a user. The third party computer 110a-c may be configured to recognize the first name identifier tag and the last name identifier tag, and append the corresponding identifiers for the first name identifier tag and the last name identifier tag to generate a full name (e.g., John Smith), that can be used as the primary key to the database of the third party computer 110a-c.

Additional types of authorization activity may include a history of fraud associated with an account identifier, a length of time since the most recent authentication, a date and time of the most recent authentication, a number of successful authentications in a predetermined time period, a number of unsuccessful authentication in a predetermined time period, and a length of time since first appearance of account.

In embodiments, each authorization activity may have a corresponding value. The value of an authorization activity may be an alphanumeric or numeric value. The get_lastlogin tag may have a value associated with the date and time of the last authentication (e.g., the last time the user or device was logged in at the third party computer) may be a value expressed as a calendar date. The get_frauddetected tag may have a value associated with the history of fraud associated with the user or device and may be a listing of locations, dates, and time associated with access requests or other types of transactions that were flagged as potentially fraudulent and/or confirmed fraudulent. The get_#authsuccesses tag may have a numeric value associated with the number of successful authentications performed with the third party computer within a defined period. The get_#authfailures tag may have a numeric value associated with the number of failed authentications performed with the third party computer within a defined period. The get_firstactivity tag may have a value associated with the date and time of the first interactions by the user or device with the third party computer.

B. Obtaining Values from Third Party Computers

As described previously, the processor server computer 108 may generate a query message using a query template and request identifiers and/or profile identifiers. The processor server computer 108 may then transmit the query message to the third party computers 110a-c using the appropriate APIs for each. In response to receiving the query message, each of the third party computers 110a-c may generate a query response message. The query response messages may then be transmitted back to the processor server computer 108.

Each of the third party computer 110a-c may evaluate the query message and the identifiers it contains to determine corresponding authorization activity data for the identifiers. The authorization activity data for each third party computer 110a-c may be stored in profiles in corresponding databases of the third party computers 110a-c.

For example, the query message may contain eight identifier tags with identifiers. Third party computer 1 110a may have authorization activity data for five of the eight identifiers, and no authorization activity data for the remaining three identifiers. In some embodiments, third party computer 1 110a may not have any previous knowledge of these three identifiers and may add the three identifiers to the profile stored by the third party computer 1 110a. In some embodiments, third party computer 1 110a may choose to wait to add the three identifiers to its profile until it receives a pre-established number of requests.

Third party computer 2 110b may have authorization activity data for eight of the eight identifiers, and third party computer n 110c may have no authorization activity data for any of the identifiers.

The third party computers 110a-c may then determine the authorization activities requested by the processor server computer 108 in the query message, in addition to the format for the data requested for the requested authorization activities. For example, in reference to the query message 400 of FIG. 4, third party computer 1 110a may access a database of authorization activities, locate the user name "j smith," and retrieve a date of the last login by user name "j smith". In some embodiments, where third party computer 1 110a does not have authorization activity data for a requested authorization activity, third party computer 1 110a may return a "NULL" or another indicator to the processor server computer 108 that no applicable data for the authorization activity is available.

Once third party computer 1 110a has completed retrieving the authorization activity data, third party computer 1 110a may then generate a query response message including the authorization activities and their values for the identifiers in the query message. The other third party computers 110b-c may also prepare query response messages based on their retrieved authorization activity data in a similar manner as third party computer 1 110a.

FIG. 5 shows an exemplary query response message 500 according to an embodiment of the invention. As depicted in FIG. 5, the query response message 500 may include a plurality of authorization activity values populated into the corresponding authorization activity tags 506 the query message 400 initially sent by the processor server computer 108. In some embodiments, the third party computers 110a-c may modify the received query message 400 to include the authorization activity values to generate the query response message 500. In other embodiments, the query response message 500 may be a new message generated by third party computers 110a-c. In some embodiments, the authorization activity tags 506 may include an additional value to allow the third party computers 110a-c to indicate that they have stored authorization activity for the corresponding authorization activity tags 506. In such embodiments, the value may be either a "Y" or "N."

In addition, one or more of the third party computers 110*a-c* may have additional identifiers that are associated with the identifiers received in the query message that may not be known by the processor server computer 108. For example, using the query message 400 of FIG. 4, the processor server computer 108 may have the user name "j smith" stored in a profile. Third party computer 1 110*a* may also have previously correlated or associated the user name "jsmith23" with the same profile. For example, third party computer 1 110*a* may have previously correlated user name "jsmith23" with a phone number or email address associated with user name "j smith". In such situations, third party computer 1 110*a* may retrieve authorization activity for both "jsmith" and "jsmith23", and transmit such data back to the processor server computer 108 in the query response message.

In such embodiments, third party computer 1 110*a* may modify query response to append, or otherwise include, the "jsmith23" user name in the query response message. In some embodiments, third party computer 1 110*a* may add the "jsmith23" user name into the corresponding identifier tag for user names. In other embodiments, third party computer 1 110*a* may add the "jsmith23" user name to a reserved space (e.g., 404), and provide an indicator as to the type of identifier tag the data in the reserved space is identified as.

In other embodiments, the processor server computer 108 may have a sub-set of the plurality of identifier tags that have no associated identifiers in the profile. In such embodiments, the processor server computer 108 may receive identifiers and authorization activity correlated to the identifiers for the sub-set.

In some embodiments, when the processor server computer 108 receives the query response messages from the third party computers 110*a-c*, the processor server computer 108 can combine authorization activities from different third party computers 110*a-c* for the new or previously unknown identifiers. In such embodiments, the processor server computer 108 may correlate authorization activity for the sub-set of the plurality of identifier tags from multiple third party computers 110*a-c*. Using the above example, while the processor server computer 108 may not have known the "jsmith23" user name, third party computer 1 110*a* and third party computer 2 110*b* may both have authorization activity related to "jsmith23," and the processor server computer 108 can correlate the authorization activity from both third party computers 110*a* and 110*b* in its decisioning, as described below. In some embodiments, the processor server computer 108 may locate the corresponding identifier tag for "user name" in the profile and modify the profile with the corresponding new identifier (e.g., jsmith23).

In some embodiments, when the processor server computer 108 receives the authorization activity from the third party computer 110*a-c*, the processor server computer 108 may update the profile to include the authorization activity received in the plurality of query responses.

C. Using Values in a Risk Model for Decisioning

As part of the authorization decisioning, the processor server computer 108 may include a risk model (e.g., an authorization model). The risk model may be a function or algorithm that takes in a plurality of inputs, including the history of authentications and authorizations associated with users and/or devices, to calculate an output. In some embodiments, where the processor server computer 108 receives a request for authorization to access a resource, the processor server computer 108 may use data stored at the processor server computer 108 with the risk model. Typically, the more inputs that are inputted into the risk model, the higher the predictive value of the output. To that end, in other embodiments, the processor server computer 108 may use the data from the query responses from the third party computers 110*a-c* with the risk model.

In some embodiments, the risk model may assign different weights to each of the inputs based on reliability of data, confidence in data sources, strength of predictive value of inputs, and other factors. The different weights may be variable. The risk model may assigns weights to the values of the authorization activities received from third party computers 110*a-c* and apply the weighted values to the authorization model. For example, first data from a first data source may include a history of 30 previous authorization processes with the user, while second data from a second data source may include a history of one previous authorization process. In such a situation, the risk model may apply a lower weight to the second data from the second data source because it has less predictive value due to the smaller data set.

In some embodiments, the risk model may also take in the values of authorization activity data stored by the processor server computer 108. The stored authorization activity data may include authorization processes performed by the processor server computer 108 and/or authorization activity data received from third party computers 110*a-c* in response to previous requests for authorization to access a resource. The risk model may similarly assigns weights to the stored values of the stored authorization activity, and the weighted stored values may then be applied to the authorization model.

For example, as shown in a query response 500 of FIG. 5, the get_lastlogin tag may have a value "2015-11-03" for date and "08:02:45 GMT" for time. Based on the current time this may indicate that the user or device recently completed an authorization process with one of the third party computers 110*a-c*. For example, the date and time of the get_lastlogin tag may be ten minutes prior to the current request. In some embodiments, this may be given a higher weight as it is more recent data. If the get_lastlogin tag had a value that was of a date from an extended period of time (e.g., weeks or months), a lower weight may be applied by the processor server computer 108.

In another example, as shown in a query response 500 of FIG. 5, the get_#authsuccesses tag may have a value "25," which may indicate that the user or device has performed 25 successful authorizations, and the get_#authfailures tag may have a value "1," which may indicate that the user or device has performed 1 failed authorizations. Based on settings, the value associated with the get_#authsuccesses tag may be a total lifetime number of successful authorizations or a total number of successful authorizations within a set period of time (e.g., within the previous 30 days). The value of the get_#authfailures tag may be expressed in a similar manner. In some embodiments, the number of successful and fail authorizations may be given a higher weight as they are better indications of actual authorization process.

The output of the risk model may be a risk score or another indicator of the risk associated with the user and/or device. The risk score may be compared to a pre-established risk threshold in determining a response to the request for authorization to access the resources. In such embodiments, when the risk score indicates a low risk in comparison to the risk threshold, authorization may be granted, whereas when the risk score indicates a high risk in comparison to the risk threshold, authorization may be denied.

V. Methods

Figure 6:
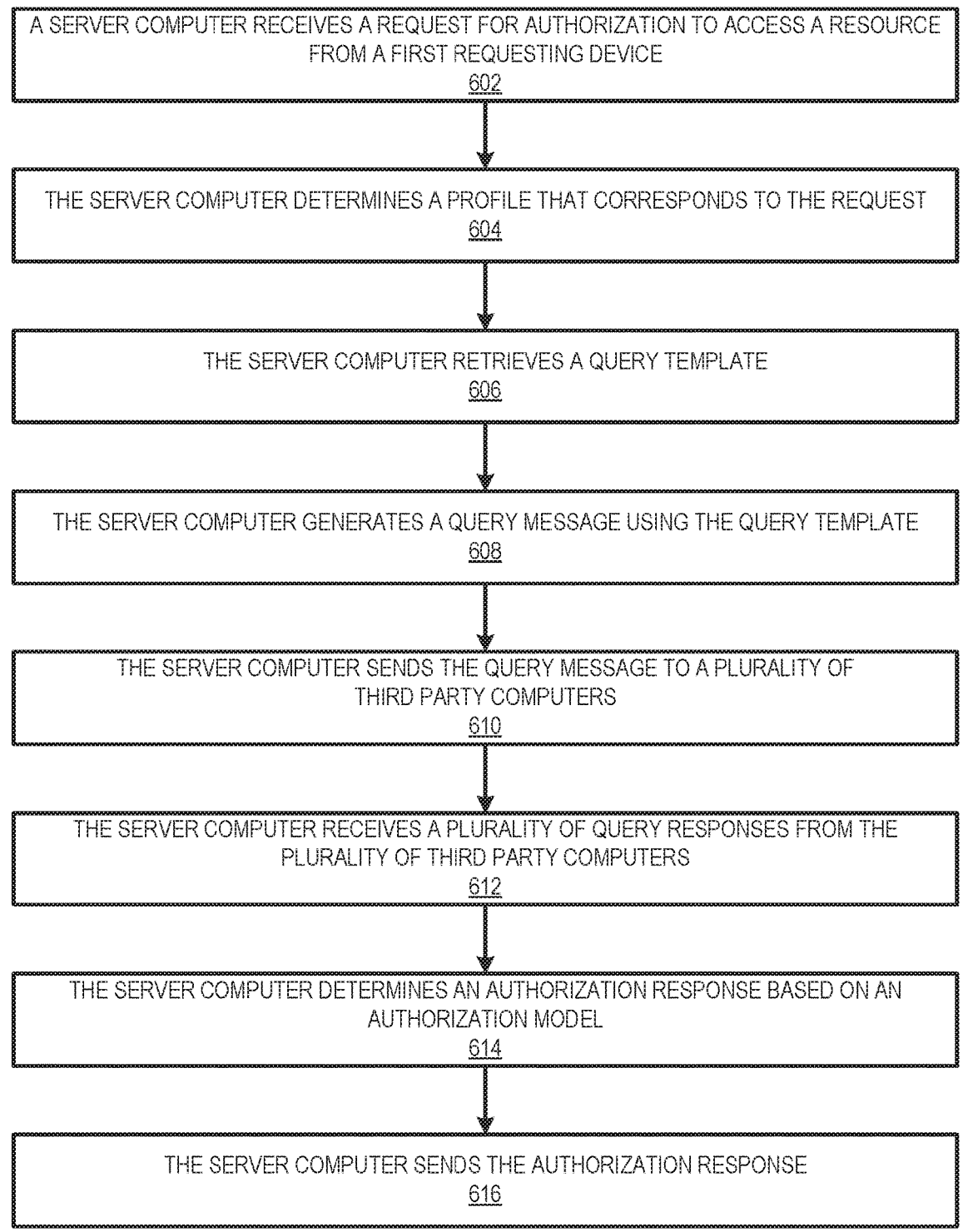
FIG. 6 shows a flowchart of a method of using third party data to authenticate a transaction according to an embodiment of the invention
Figure 7:
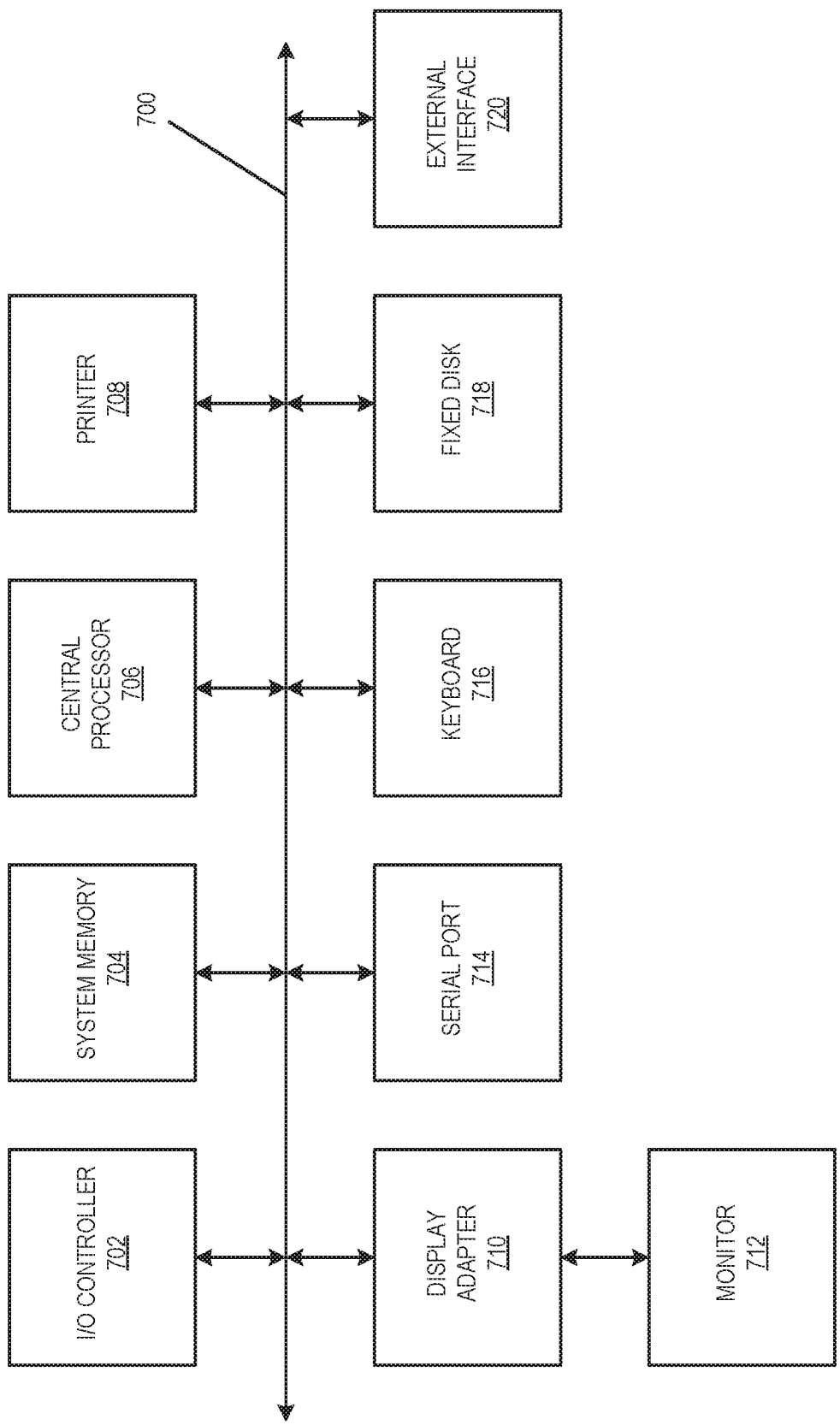
FIG. 7 shows an exemplary block diagram of a computer apparatus according to an embodiment of the invention.

FIG. 6 shows a flowchart of a method 500 of using third party data to authenticate a transaction according to an embodiment of the invention. Additional methods and processes may be included within these methods and may be recognized by one of ordinary skill in the art, in light of the description below. Further, in some embodiments, the described methods may be combined, mixed, and matched, as one of ordinary skill would recognize. In the embodiment described herein, the server computer may be a server computer within a processor server computer 108.

In step 602, a server computer (e.g., processor server computer 108) may receive a request for authorization to access a resource from a first electronic device (e.g., an intermediate requesting device 104). In some embodiments, the resource may be a computer, an account, a venue/system, a building, etc. In some embodiments, where in the resource is an account, the request for authorization to access the resource may a request for authorization of a transaction using the account.

In some embodiments, the request for authorization to access the resource may be generated by a first requesting device 102 and sent to the intermediate requesting device 104. In other embodiments, when the first requesting device 102 requests authorization to access the resource 106, the intermediate requesting device 104 may generate the request for authorization to access the resource and send the request message to the processor server computer 108 to determine whether the request for authorization to access the resource 106 should be granted or denied. In other embodiments, the request message may be generated by the resource 106 and sent to the processor server computer 108 (either through a direct communications or via the intermediate requesting device 104

The request may include request identification data composed of request identifiers. The processor server computer 108 may use the request identification idea in determining whether to provide the first requesting device 102 access to the resource. Examples of identifiers may include, but are not limited to, a device type, a device identifier, an account number, a user identifier, a user name, an email address, a physical address, a phone number, an internet protocol (IP) address, browser data, application data, operating system data, GPS location data, and biometric data. The request identifiers may include one or more of these identifiers.

In step 604, the processor server computer 108 may determine that at least one of the request identifiers in the request corresponds to a profile. The processor server computer 108 may access a database coupled to the processor server computer 108 storing profiles, and perform a search through the database using the request identifiers. For example, the processor server computer 108 may be able to link a request identifier representing an email address to a profile stored in the database. The profile may include one or more profile identifiers, which may include one or more of the above-noted identifiers.

In step 606, the processor server computer 108 may retrieve a query template. The processor may retrieve the query template from the database. In some embodiments, the query template may include a plurality of identifier tags. The identifier tags may be field codes or indicators of the types of identifiers to be included in corresponding fields in the query template. Each identifier tag may correspond to a different type of identifier. FIG. 3 shows an exemplary query template according to an embodiment of the invention.

In some embodiments, the query template may also include an application programming interface (API) for requesting information about the identifier tags from third party computer 110a-c. The API may allow the processor server computer 108 or an application operating on the processor server computer 108 to interface with and transmit data to the third party computers 110a-c or applications operating on the third party computer 110a-c.

In step 608, the processor server computer 108 may generate a query message using the query template. The processor server computer 108 may generate the query message by inserting at least one of the request identifiers and the profile identifiers into the query template in association with the corresponding identifier tags. As shown in FIG. 4, the identifier tags for first name, last name, user name, email address, and device identifier have been populated with identifiers, which may have been retrieve either from the request or from the profile.

In step 610, the processor server computer 108 may send the query message to a plurality of third party server computers 110a-c. The query message may be sent to the third party computers 110a-c using a communications protocol through a communications channel or network. Each query message sent to the third party computers 110a-c may contain the same content (e.g., the identifiers), but may be formatted based on API requirements associated with each of the third party computers 110a-c.

The third party computers 110a-c may receive the query message from the processor server computer 108. The third party computers 110a-c may determine the identifier tags and corresponding identifiers included in the query message. The identifier tags may be used as pointers or an index into data storage of the third party computers 110a-c. For example, the identifier tag "emailaddress" may be used by each of the third party computers 110a-c as an indicator to access a data storage area for email addresses. The third party computers 110a-c may then use the identifier "jsmith@email.com" as a search criterion to parse through the data storage area for email addresses.

In step 612, the processor server computer 108 may receive a plurality of query responses from the plurality of third party computers 110a-c. Each of the query responses may include one or more authorization activity entry for each of one or more of the identifier tags. The authorization activity may include a history of fraud associated with an account identifier, a length of time since the most recent authentication, a date and time of the most recent authentication, a number of successful authentications in a predetermined time period, a number of unsuccessful authentication in a predetermined time period, and a length of time since first appearance of account.

In step 614, the processor server computer 108 may determine an authorization response using an authorization model. When the processor server computer 108 receives the query responses, the processor server computer 108 may retrieves an activity value for each of the authorization activity entries. For example, the activity value for the number of successful authorizations within a predetermined period of time associated with a device identifier may be a numeric value, while the activity value for the date of last login associated with a user name may be a calendar date. In some embodiments, the activity value may be a risk score or fraud ratio. The processor server computer 108 may then apply a weight to each of the authorization activities on confidence and reliability in the data or the source third party computer 110*a-c* of the data. The weighted values may then be applied as inputs to the authorization model. The authorization model may be an algorithm or function that produces an output. In some embodiments, the output may be a risk score. The risk score may be compared to a pre-established risk threshold in determining a response to the request for authorization to access the resources. In such embodiments, when the risk score indicates a low level of risk in comparison to the risk threshold, authorization may be granted, whereas when the risk score indicates a high level of risk in comparison to the risk threshold, authorization may be denied.

In some embodiments, when the risk score indicates a high level of risk, the processor server computer 108 may perform additional authentication processes for the request for authorization to access the resource. In other embodiments, the processor server computer 108 may send an indicator to the intermediate requesting device 104 and/or the resource 106 that additional authentication processes should be performed prior to granting authorization for the first requesting device 102 to access the resource.

In some embodiments, the processor server computer 108 may send the authorization model to an external risk analyzer computer. The authorization model may be sent to the external risk analyzer computer in a risk score request message generated by the processor server computer 108. In such embodiments, the external risk analyzer computer may perform a risk analysis using the authorization model. The external risk analyzer computer may then generate a risk score for the request based on the authorization model. The processor server computer 108 may then receive the risk score for the request from the external risk analyzer computer. In other embodiments, the risk score may be determined via a risk analysis performed by the processor server computer 108.

In step 616, when the processor server computer 108 determines an authorization response to the request, the processor server computer 108 may send the authorization response back to the first requesting device 102 indicating the authorization decision. In other embodiments, the processor server computer 108 may send the authorization response back to an intermediate requesting device 104 that may be associated with the resource 106.

VI. Creating Risk Chains and Rings

In some embodiments, the processor server computer 108 may link the processor server computer 108 to the plurality of third party computers 110*a-c* into a decisioning system. In some embodiments, the decisioning system may be expressed as a ring pattern or as a chain pattern.

In the ring decisioning system, authorization activity data from each of the third party computers 110*a-c* and the payment processing server computer 108 is joined together in a ring decisioning system. In some embodiments, when a new third party computer is queried by the processor server computer 108, the new third party computer may be added into the ring decisioning system. In some embodiments, as the third party computers 110*a-c* and the payment processing server computer 108 are in the ring decisioning system, any entity requesting data for a request may query any of computers in the ring first, and then proceed to the next computer in the ring, and so on until all the computers in the ring decisioning system have been queried.

In the ring decisioning system, all authorization activity data elements from the third party computers 110*a-c* may be available for analysis by the processor server computer 108, as well as by the other third party computers 110*a-c*. Using a query message generated using a query template, any third party computers 110*a-c* may be accessed.

In the chain decisioning system, authorization activity data from one or more of the third party computers 110*a-c* and the payment processing server computer 108 may be linked together in a chain. Each chain decisioning system may have a different subset of the authorization activity data from the third party computers 110*a-c*, and may be limited to authorization activity data only from those third party computers 110*a-c* associated on a particular chain. For example, a first chain decisioning system may include third party computer 1 110*a*, while a second chain decisioning system may include third party computer 1 110*a* and third party computer 2 110*b*. In some embodiments, different decisioning chains may be accessed by the processor server computer 108 based on the request for authorization to access the resource. For example, the first chain decisioning system may be optimal for authorizing access to a computer resource, while the second chain decisioning system may be optimal for authorizing transactions (e.g., financial transactions).

VII. Technical Benefits

Embodiments of the present invention may provide a number of advantages and technical benefits. For example, embodiments can provide a communications interface for obtaining information from third party computers, and an efficient process for generating queries to the third party computers. Further, embodiments may provide the technical benefit of faster and more efficient transaction processing services. As the third party computers and the processor server computer may have a significant amount of data regarding authentication processes involving a user and/or device, authorizations for accessing resource may be conducted more efficiently, more rapidly, and with a higher degree of confidence that the decision was proper.

In addition, the use of a single query message that is uniform based on request identifiers and profile identifiers, and sent to all third party computers provides greater efficiency than solutions where different query messages have to be sent to different third party computers based on the data the third party computers have. Also, by using a single query message sent in parallel to all the third party computers, there is less time and resources wasted than sending the query message iteratively to each third party computer one at a time.

In some embodiments, computing resources may be preserved through reducing the number of transactions requiring stepped up authentication. In some embodiments, transactions that would customarily be required to conduct a full authentication or authorization process (e.g., using a user id/password, challenge question) may be authenticated based on the previous authorization activity associated with the user or device.

VIII. Example Computer Systems

The various participants and elements described herein may operate one or more computer apparatuses to facilitate the functions described herein. Any of the elements in the above-described FIG. 1, including any servers or databases, may use any suitable number of subsystems to facilitate the functions described herein.

Examples of such subsystems or components are shown in FIG. 6. The subsystems shown in FIG. 6 are interconnected via a system bus 700. Additional subsystems such as a printer 708, keyboard 716, fixed disk 718 (or other memory comprising computer readable media), monitor 712, which is coupled to display adapter 710, and others are shown. Peripherals and input/output (I/O) devices, which couple to I/O controller 702 (which can be a processor or other suitable controller), can be connected to the computer system by any number of means known in the art, such as serial port 714. For example, serial port 714 or external interface 720 can be used to connect the computer apparatus to a wide area network such as the Internet, a mouse input device, or a scanner. The interconnection via system bus allows the central processor 706 to communicate with each subsystem and to control the execution of instructions from system memory 704 or the fixed disk 718, as well as the exchange of information between subsystems. The system memory 704 and/or the fixed disk 718 may embody a computer readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method of using a third party computer to facilitate a server computer to provide authorization to a requested resource for a requesting electronic device, the method comprising:

receiving, by the third party computer from the server computer, a query message including one or more identifier tags, wherein the query message corresponds to a query template including an API for requesting information about authorization activity associated with the one or more identifier tags, the authorization activity corresponding to one or more previous requests to the third party computer for access to a corresponding resource different than the requested resource, wherein the authorization activity is a login at the third party computer with a device associated with a request for authorization to access the requested resource, and wherein the login at the third party computer occurred within a specific amount of time preceding the request from the requesting electronic device, and wherein each identifier tag corresponds to a different type of identifier, the query message generated by inserting (1) one or more request identifiers of the request from the requesting electronic device and/or (2) one or more profile identifiers corresponding to a profile stored on a database of the server computer in association with the one or more identifier tags;

determining, by the third party computer, one or more authorization activity entries for each of the one or more identifier tags, wherein at least one of the authorization activity entries relates to a success of the one or more previous requests to the third party computer;

generating, by the third party computer, a query response including the one or more authorization activity entries and the one or more identifier tags; and sending, by the third party computer, the query response to the server computer for determining an authorization response to the request from the requesting electronic device for the requested resource.

2. The method of claim 1, wherein the query response additionally comprises one or more authorization activity tags, and wherein generating the query response comprises inserting, by the third party computer, the one or more authorization activity entries into the query message in association with the one or more authorization activity tags.

3. The method of claim 1, wherein the authorization activity entries include one or more of the following: a history of fraud associated with an account identifier, a length of time since a most recent authentication, a date and time of the most recent authentication, a number of successful authentications in a predetermined time period, a number of unsuccessful authentications in a predetermined time period, and a length of time since a first appearance of an account.

4. The method of claim 1, wherein the requested resource is a computer, and wherein the request from the requesting electronic device is a request to access the computer.

5. The method of claim 1, wherein the one or more request identifiers includes at least two different types of values.

6. The method of claim 1, wherein the one or more profile identifiers includes at least two different types of values.

7. The method of claim 1, further comprising:

identifying, by the third party computer, one or more new identifiers of the one or more request identifiers and/or of the one or more profile identifiers, wherein the one or more new identifiers were not previously stored in a profile in a database of the third party computer; and storing, by the third party computer, the one or more new identifiers in the profile in the database of the third party computer.

8. The method of claim 1, wherein the one or more authorization activity entries are stored in a profile in a database of the third party computer, wherein determining the one or more authorization activity entries comprises:

determining, by the third party computer, a primary key or a foreign key based on the one or more request identifiers and/or of the one or more profile identifiers;

querying, by the third party computer, the database using the primary key or the foreign key; and retrieving, by the third party computer, the one or more authorization activity entries.

9. The method of claim 8, wherein determining the primary key or the foreign key based on the one or more request identifiers and/or of the one or more profile identifiers comprises:

identifying two or more identifiers of the one or more request identifiers and one or more profile identifiers corresponding to the primary key; and appending the two or more identifiers together to generate the primary key.

10. A server computer comprising:

a processor;

a database; and a non-transitory computer readable medium coupled to the processor, the non-transitory computer readable medium comprising code, executable by the processor, to implement a method of using a third party computer to facilitate the server computer to provide authorization to a requested resource for a requesting electronic device, the method comprising:

receiving, by the third party computer from the server computer, a query message including one or more identifier tags, wherein the query message corresponds to a query template including an API for requesting information about authorization activity associated with the one or more identifier tags, the authorization activity corresponding to one or more previous requests to the third party computer for access to a corresponding resource different than the requested resource, wherein the authorization activity is a login at the third party computer with a device associated with a request for authorization to access the requested resource, and wherein the login at the third party computer occurred within a specific amount of time preceding the request from the requesting electronic device, and wherein each identifier tag corresponds to a different type of identifier, the query message generated by inserting (1) one or more request identifiers of the request from the requesting electronic device and/or (2) one or more profile identifiers corresponding to a profile stored on a database of the server computer in association with the one or more identifier tags;

determining, by the third party computer, one or more authorization activity entries for each of the one or more identifier tags, wherein at least one of the authorization activity entries relates to a success of the one or more previous requests to the third party computer;

generating, by the third party computer, a query response including the one or more authorization activity entries and the one or more identifier tags; and sending, by the third party computer, the query response to the server computer for determining an authorization response to the request from the requesting electronic device for the requested resource.

11. The server computer of claim 10, wherein the query response additionally comprises one or more authorization activity tags, and wherein generating the query response comprises inserting, by the third party computer, the one or more authorization activity entries into the query message in association with the one or more authorization activity tags.

12. The server computer of claim 10, wherein the authorization activity entries include one or more of the following: a history of fraud associated with an account identifier, a length of time since a most recent authentication, a date and time of the most recent authentication, a number of successful authentications in a predetermined time period, a number of unsuccessful authentications in a predetermined time period, and a length of time since a first appearance of an account.

13. The server computer of claim 10, wherein the requested resource is a computer, and wherein the request from the requesting electronic device is a request to access the computer.

14. The server computer of claim 10, wherein the one or more request identifiers includes at least two different types of values.

15. The server computer of claim 10, wherein the one or more profile identifiers includes at least two different types of values.

16. The server computer of claim 10, wherein the method further comprises:

identifying, by the third party computer, one or more new identifiers of the one or more request identifiers and/or of the one or more profile identifiers, wherein the one or more new identifiers were not previously stored in a profile in a database of the third party computer; and storing, by the third party computer, the one or more new identifiers in the profile in the database of the third party computer.

17. The server computer of claim 10, wherein the one or more authorization activity entries are stored in a profile in a database of the third party computer, wherein determining the one or more authorization activity entries comprises:

determining, by the third party computer, a primary key or a foreign key based on the one or more request identifiers and/or of the one or more profile identifiers;

querying, by the third party computer, the database using the primary key or the foreign key; and retrieving, by the third party computer, the one or more authorization activity entries.

18. The server computer of claim 17, wherein determining the primary key or the foreign key based on the one or more request identifiers and/or the one or more profile identifiers comprises:

identifying two or more identifiers of the one or more request identifiers and the one or more profile identifiers corresponding to the primary key; and appending the two or more identifiers together to generate the primary key.

* * * * *